(12) United States Patent
Neudorf et al.

(10) Patent No.: US 8,299,987 B2
(45) Date of Patent: Oct. 30, 2012

(54) MODULATION METHOD AND APPARATUS FOR DIMMING AND/OR COLOUR MIXING UTILIZING LEDS

(75) Inventors: Jason Neudorf, Kitchener (CA); Steve Lyons, Wallenstein (CA); David Tikkanen, Waterloo (CA)

(73) Assignee: Lumastream Canada ULC, Calgary, Alberta (CA)

( * ) Notice: Subject to any disclaimer, the term of this patent is extended or adjusted under 35 U.S.C. 154(b) by 819 days.

(21) Appl. No.: 11/550,937

(22) Filed: Oct. 19, 2006

(65) Prior Publication Data

US 2007/0103086 A1    May 10, 2007

Related U.S. Application Data

(60) Provisional application No. 60/796,550, filed on May 2, 2006, provisional application No. 60/735,220, filed on Nov. 10, 2005.

(51) Int. Cl.
*G09G 3/32* (2006.01)

(52) U.S. Cl. ........... 345/82; 345/76; 345/77; 345/83; 345/204; 345/690; 315/291; 315/169.3; 315/312

(58) Field of Classification Search ............ 345/82–83, 345/39, 204–214, 76–77; 315/149, 169.3, 315/291, 294, 297, 307, 224, 312, 318, 360, 315/362
See application file for complete search history.

(56) References Cited

U.S. PATENT DOCUMENTS

| | | | |
|---|---|---|---|
| 6,016,038 A * | 1/2000 | Mueller et al. ............. | 315/291 |
| 6,043,615 A | 3/2000 | Forbes | |
| 6,169,376 B1 | 1/2001 | Greenberg et al. | |
| 6,630,801 B2 | 10/2003 | Schuurmans | |
| 6,815,625 B1 * | 11/2004 | Leopold et al. ............. | 200/296 |
| 6,883,929 B2 | 4/2005 | Dowling | |
| 6,963,175 B2 | 11/2005 | Archenhold et al. | |
| 6,967,447 B2 | 11/2005 | Lim et al. | |
| 6,969,180 B2 | 11/2005 | Waters | |
| 6,987,787 B1 * | 1/2006 | Mick ........................ | 372/29.021 |
| 7,088,059 B2 | 8/2006 | McKinney et al. | |
| 7,310,074 B2 * | 12/2007 | Chen ............................. | 345/82 |
| 7,535,606 B1 * | 5/2009 | Walton et al. ................ | 358/509 |
| 7,567,223 B2 * | 7/2009 | De Oto et al. .................. | 345/76 |
| 2002/0005861 A1 * | 1/2002 | Lewis .......................... | 345/691 |

(Continued)

FOREIGN PATENT DOCUMENTS

JP    2005274883 A * 10/2005

(Continued)

OTHER PUBLICATIONS

"MAXIM 2MHz High-Brightness LED Drivers with High-Side Current Sense and 5000:1 Dimming", http://www.maxim-ic.com.

(Continued)

*Primary Examiner* — Lun-Yi Lao
*Assistant Examiner* — Sosina Abebe
(74) *Attorney, Agent, or Firm* — Borden Ladner Gervais LLP; Jeffrey W. Wong

(57) ABSTRACT

There is provided apparatus for controlling a set of light emitting diodes (LEDs) comprising at least one current source for powering the set of LEDs; a main controller for receiving dimming and/or color mixing information and for translating the information into LED control information and transmitting the LED control information to control the set of LEDs; wherein the LED control information is based on and off times.

28 Claims, 8 Drawing Sheets

U.S. PATENT DOCUMENTS

| | | | |
|---|---|---|---|
| 2002/0101198 A1* | 8/2002 | Kemp | 315/291 |
| 2003/0057888 A1 | 3/2003 | Archenhold et al. | |
| 2003/0076056 A1 | 4/2003 | Schuurmans | |
| 2003/0214259 A9* | 11/2003 | Dowling et al. | 315/312 |
| 2004/0046726 A1* | 3/2004 | Sako et al. | 345/98 |
| 2004/0155844 A1* | 8/2004 | Stopa | 345/82 |
| 2004/0240890 A1 | 12/2004 | Lys et al. | |
| 2005/0023991 A1 | 2/2005 | Kemper | |
| 2005/0122065 A1* | 6/2005 | Young | 315/294 |
| 2005/0128751 A1 | 6/2005 | Roberge et al. | |
| 2005/0134529 A1 | 6/2005 | Lei et al. | |
| 2005/0225976 A1 | 10/2005 | Zampini et al. | |
| 2005/0231948 A1 | 10/2005 | Pohlert et al. | |
| 2005/0232132 A1 | 10/2005 | Ashdown et al. | |
| 2006/0017402 A1* | 1/2006 | McKinney et al. | 315/291 |
| 2006/0082529 A1* | 4/2006 | Oyama | 345/82 |
| 2006/0164377 A1 | 7/2006 | Struebel et al. | |
| 2009/0195182 A1* | 8/2009 | Ezaki | 315/294 |

FOREIGN PATENT DOCUMENTS

| | | |
|---|---|---|
| WO | 2005012997 | 2/2005 |
| WO | 2006107199 | 12/2006 |

OTHER PUBLICATIONS

Canadian Intellectual Property Office Office Action for CA Patent App. No. 2564659, Apr. 8, 2011.

* cited by examiner

| Desired Intensity | Intensity Name | On Time | Off Time | (Sum of On Time + Off Time)=Period | Frequency (Hz) |
|---|---|---|---|---|---|
| 24.51% | Level 165 | 25x32µs =800 µs | 77x32µs =2464 µs | 3264 µs | 306 |
| 25.00 % | Level 166 | 25x32µs =800 µs | 75x32µs =2400µs | 3200 µs | 313 |
| 25.32 % | Level 167 | 40x32µs =1280 µs | 118x32µs =3776 µs | 5056µs | 198 |
| 25.81 % | Level 168 | 40x32µs =1280 µs | 115x32µs =3680 µs | 4960 µs | 202 |

Different On-Times Off-Times and Period for Different Intensities

Figure 3

MODULATION METHOD AND APPARATUS FOR DIMMING AND/OR COLOUR MIXING UTILIZING LEDS

CROSS REFERENCE TO RELATED APPLICATIONS

This application claims the benefit of priority of U.S. Provisional Patent Application No. 60/735,220 filed Nov. 10, 2005, and U.S. Provisional Patent Application No. 60/796,550 filed May 2, 2006, which are incorporated herein by reference.

FIELD OF THE INVENTION

The present invention relates generally to controlling LEDs. More particularly, the present invention relates to a method and apparatus for dimming and/or colour mixing LEDs.

BACKGROUND OF THE INVENTION

In the field of lighting technology, there are many different ways for an individual to provide light to a space, such as a room in a house. In the past, lighting levels were limited to only two positions, namely ON and OFF. Therefore, when a person wished to light up the space, they simply turned the light on. In the more recent past, in order to allow individuals to control the amount of lighting in a space, and to assist in lowering the cost to power the lighting, techniques were created which allowed the lighting to be dimmed so that the light was not always operating at a maximum level. These dimming techniques allow for lighting to also be colour-mixed so that different coloured lighting can be combined with each other to provide a plurality of different colours to light up the space.

The creation of light emitting diodes (LEDs) has also helped enhance the field lighting technology and has also assisted in lowering overall lighting costs. The combination of dimming techniques and LEDs has provided an improvement over existing lighting. Some existing techniques for dimming and/or colour mixing LEDs include Pulse Width Modulation, Variable Frequency Modulation, Bit Amplitude Modulation and Pulse Amplitude Modulation.

Pulse Width Modulation (PWM) is a method that uses a signal at a constant frequency with dimming achieved by varying the pulse width and therefore, the duty cycle of the pulse. However, when performing PWM in the digital domain (DPWM), problems occur when the system is operating at a low intensity.

If DPWM is used with 1024 steps, for example, the change in intensity from 1 step out of 1024 to 2 steps out of 1024 is a factor of two. The human eye is capable of detecting a change in intensity as little as 1% so this will be detected as a very large step change in intensity. A clock is used to determine when the pulse is to turn on and off. The clock counts at fixed intervals, and repeats at a multiple of that interval. For example, a 10-bit clock containing 1024 steps will go from 1021 to 1022 to 1023 and back to 0. The pulse on time duration begins when the clock resets to 0 and may end when the clock reaches some modulated value, for example "2" representing an intensity level. If a lower intensity level is required, the only option is to go to "1" which represents a 50% drop in intensity level and is easily seen as a large step.

Variable Frequency Modulation is a method which uses a signal having a constant pulse width. Dimming is achieved by varying the off time and therefore, frequency and duty cycle of the signal. However, this technique suffers from the problem that a wide dynamic frequency range is required for the dimming current to achieve an acceptable range of light intensities. For example, assuming a constant pulse width of 50 microseconds (in some topologies it takes a certain amount of time for current to ramp up and down into the LED since the LED cannot reach peak current instantly), a 1% light intensity value will have a dimming current frequency of 200 Hz (50/5000 microseconds).

In the case of a 50% LED light intensity, the dimming current frequency will be 10 Khz (50/100 microseconds). Electromagnetic compatibility (EMC) issues limit maximum high frequency for LEDs. Some LED manufacturers recommend maximum frequencies for LEDs in the order of 1 KHz since minimizing frequency variation is a desirable goal.

Bit Angle Modulation utilizes a binary pulse train that contains the light intensity value. Each bit of the pulse train is stretched proportionally to the binary significance of each bit and each bit of the binary word is therefore allocated a fixed range of phase angles within the drive cycle.

Another method is pulse amplitude modulation (PAM) in which a signal is converted to a digital signal and an analog channel through simple transformations, and vice versa.

It is also possible to vary the intensity of an LED by varying the amount of current passing through it but this can lead to a problems such as colour shifting.

It is, therefore, desirable to provide a novel method of modulation for the dimming and/or colour mixing of LEDs.

SUMMARY OF THE INVENTION

It is an object of the present invention to obviate or mitigate at least one disadvantage of previous methods of modulation for controlling loads, such as LEDs.

In a first aspect, the present invention provides apparatus for controlling a set of light emitting diodes (LEDs) comprising at least one current source for powering the set of LEDs; and at least one controller for controlling the at least one current source via LED control information; wherein the LED control information comprises both on and off times and period, whereby the on and off times and period are not held constant.

In a further embodiment, there is provided a method of controlling a set of LEDs comprising the steps of receiving or generating dimming and/or colour mixing information; translating the dimming and/or colour mixing information into LED control information based on both on and off times and period, whereby the on and off times and period are not constant; and transmitting the LED control information to at least one current source for powering the set of LEDs.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 3 is a table illustrating different ON/OFF times for various light intensities;

DETAILED DESCRIPTION

Generally, the present invention provides a method and apparatus for controlling the dimming and/or colour mixing of LEDs.

Figure 1:
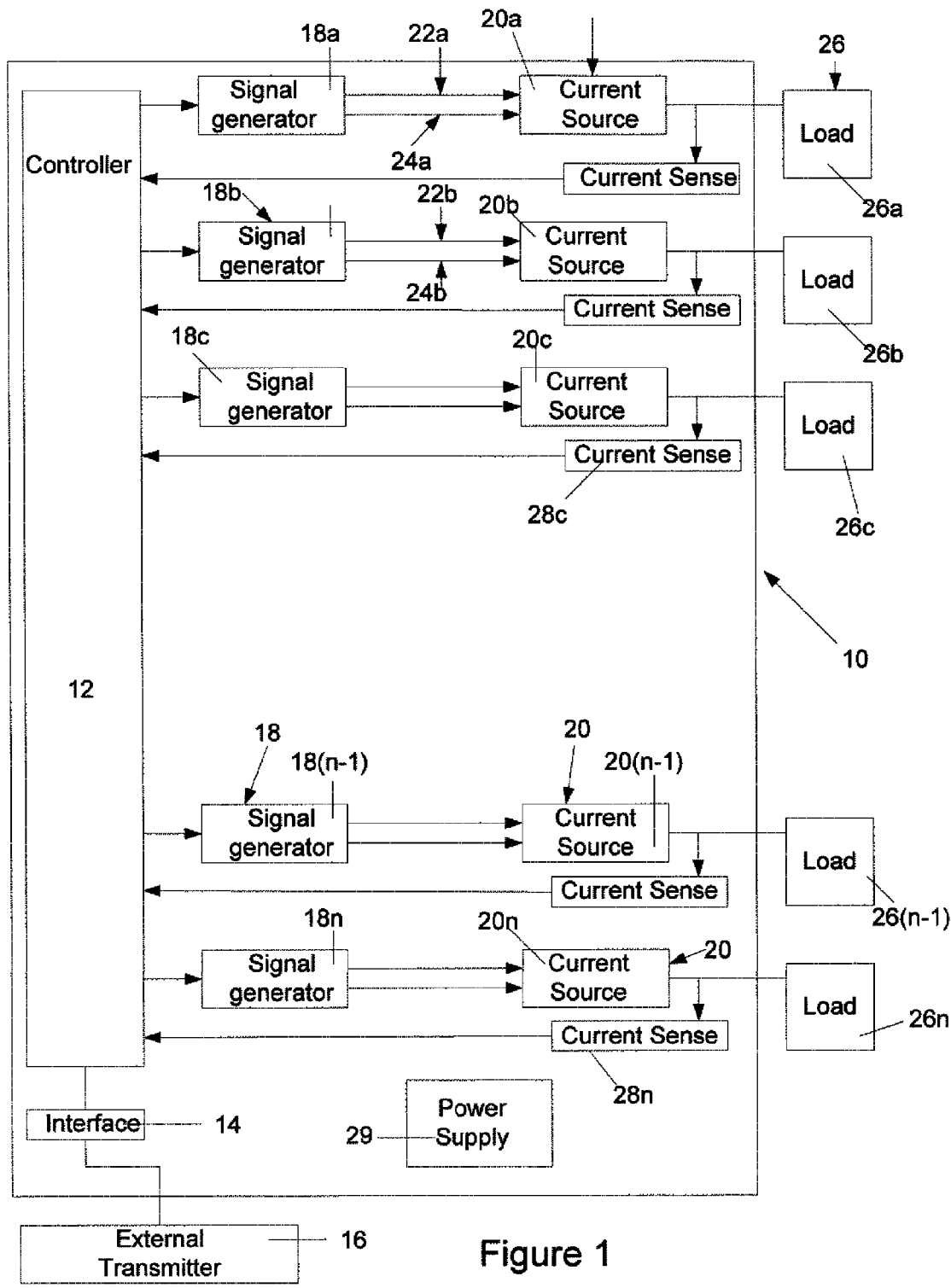
FIG. 1 is a schematic diagram of a first embodiment of apparatus for controlling LEDs.

Turning to FIG. 1, a schematic diagram of a first embodiment of apparatus for dimming and/or colour mixing LEDs is shown. The apparatus 10 comprises a controller 12 which is used to control the operation of a plurality of loads 26, such as LEDs. The apparatus 10 further comprises an interface 14 which is in communication with the controller 12. The interface 14 serves to connect the apparatus 10 to an external processor or transmitter 16, such as a DMX512A transmitter. As will be understood DMX512A is a method of digital data transmission between controllers and control equipment. It is designed to carry repetitive control data from a single controller (transmitter) to one or more receivers. The interface 14 receives signals, in the form of data packets, from the transmitter 16 containing dimming and/or colour mixing information for the apparatus 10. The data packets are then transmitted from the interface 14 to the controller 12.

The controller 12 is also connected to a plurality of signal generators 18, individually denoted as 18a to 18n where n equals any number and not simply the number 14 as might be assumed. Each signal generator 18 is connected to an individual current source 20, individually denoted as 20a to 20n. The current sources 20 preferably include ancillary circuitry for operation and comprise a buck circuit power stage with hysteretic control. In operation, the signal generator 18 typically transmits a digital signal 22 and an analog signal 24 to the current source 20. The digital 22 and analog 24 signal combining to deliver load control information. The output of the current source 20 is connected to the external load 26, seen as loads 26a to 26n, and a current sense 28, individually denoted as 28a to 28n. Each current sense 28 is connected to the controller 12 and forms a part of a digital control feedback loop. As will be understood, the loads 26, such as a set of LEDs, is what is being controlled by the apparatus 10. A power supply 29 is also located within the apparatus 10 to provide the necessary power for operation of the apparatus.

Figure 6:
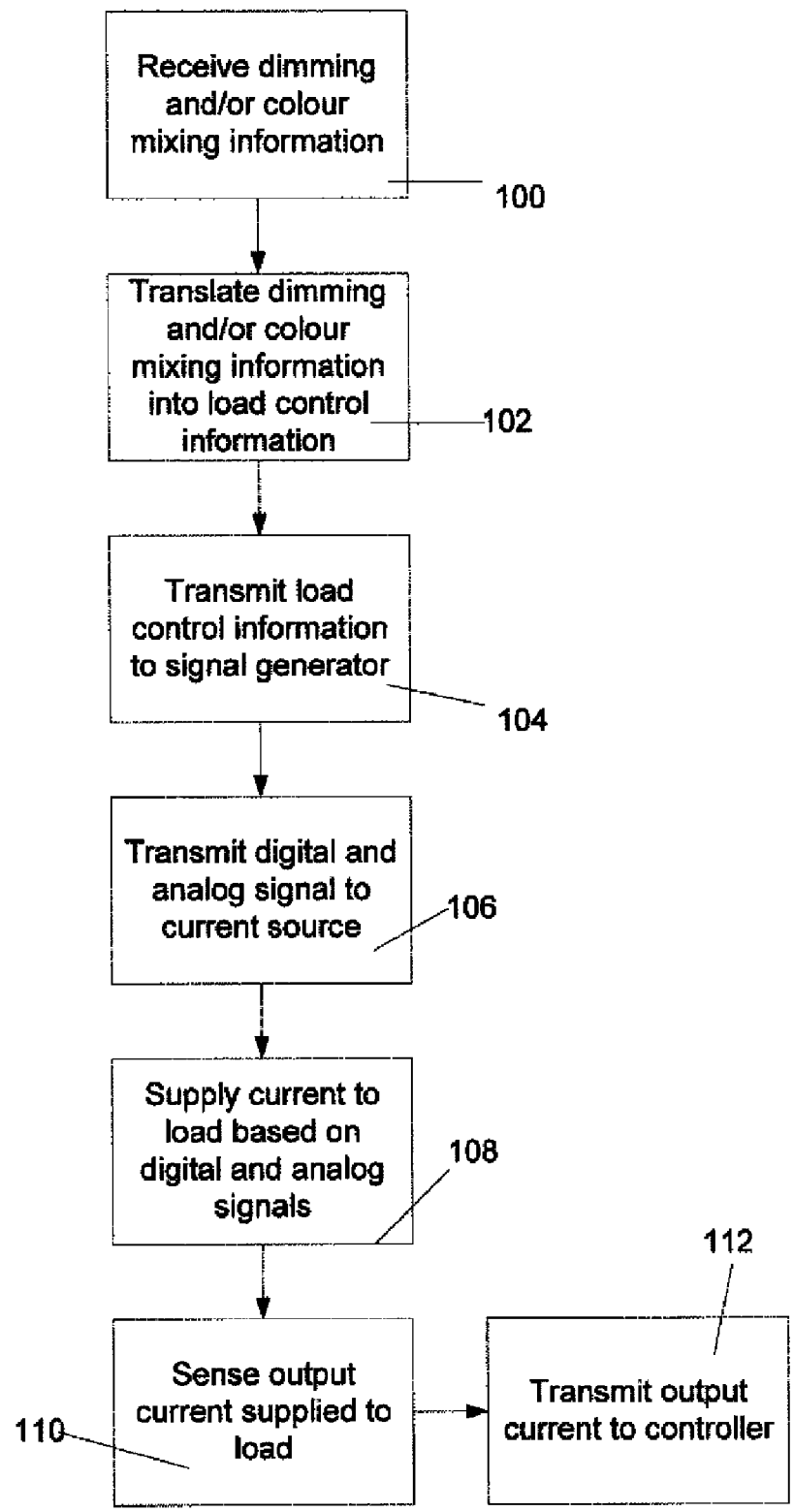
FIG. 6 is a flowchart outlining a method of controlling LEDs.
Figure 7:
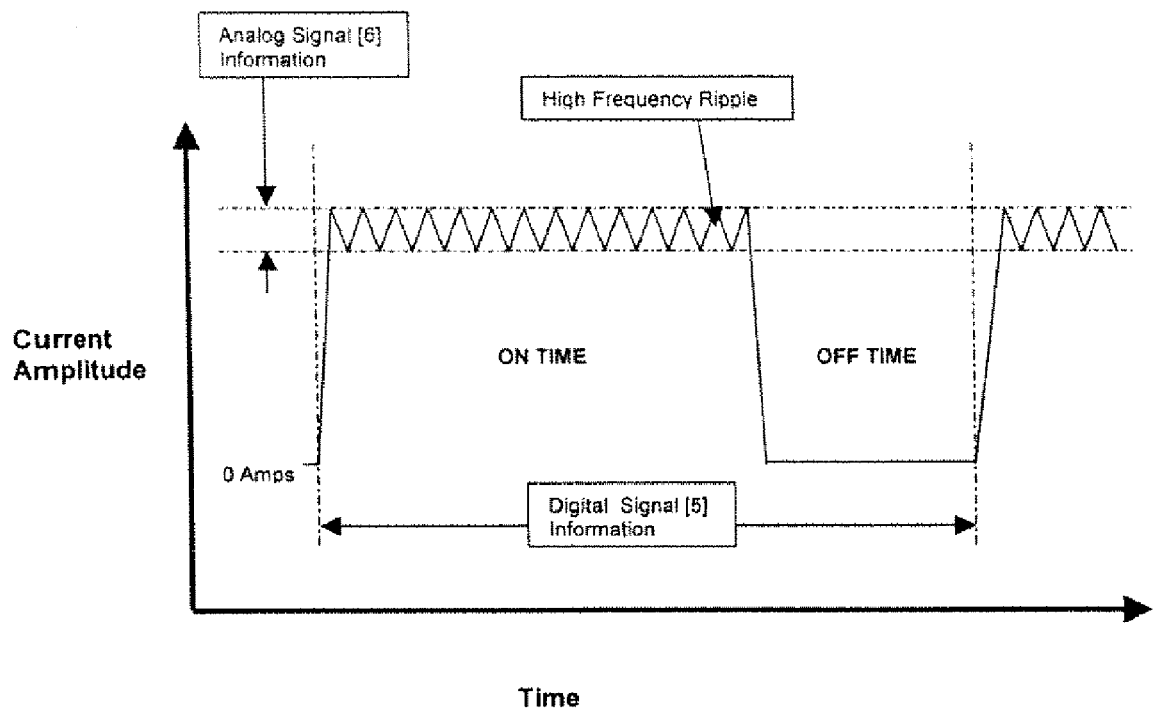
FIG. 7 is a diagram showing an output current dimming waveform.

In the following description, as schematically shown in FIG. 6, operation of the apparatus 10 is described with respect to a single load 26. It will be understood by one skilled in the art that control of each of the loads is performed in an identical manner.

Initially, dimming and colour mixing information is received by the interface 14 from an external source such as the external transmitter 16 (step 100). This dimming and/or colour mixing information is then transmitted to the controller 12 which translates this dimming and/or colour mixing information to load control information, based on on and off times and period for the load 26 (step 102) whereby the on and off times and the period are not held constant. The load control information is transmitted from the controller 12 to the signal generator 18 (step 104) in the form of instructions to generate the digital signal 22 and the analog signal 24. The digital signal 22 and the analog signal 24 are preferably generated via a digital control algorithm and 1 Bit DAC algorithm, respectively.

In one embodiment, the instructions for the digital signal 22 are preferably generated by the controller 12 accessing a digital look up table to translate required light intensity levels (as specified by the external transmitter 16) to on-time and off-time information. Alternatively, in other embodiments the on and off time information may be computed via known methods.

The digital signal 22, including the on-time and off-time information, is then transmitted to the current source 20 (step 106). FIG. 3 provides a sample table illustrating on and off times for various intensities. Therefore, if the external transmitter 16 has requested that a load 26 be turned on at an intensity of 24.51%, the on-time value equals 25×32 microseconds and the off-time value equals 77×32 microseconds. Many alternate frequencies and steps are possible. For example, one way to get 25.9% is for the on-time value to equal 265×500 nanoseconds and the off-time value to equal 755×500 nanoseconds resulting in an output frequency near 2 kHz.

Figure 2:
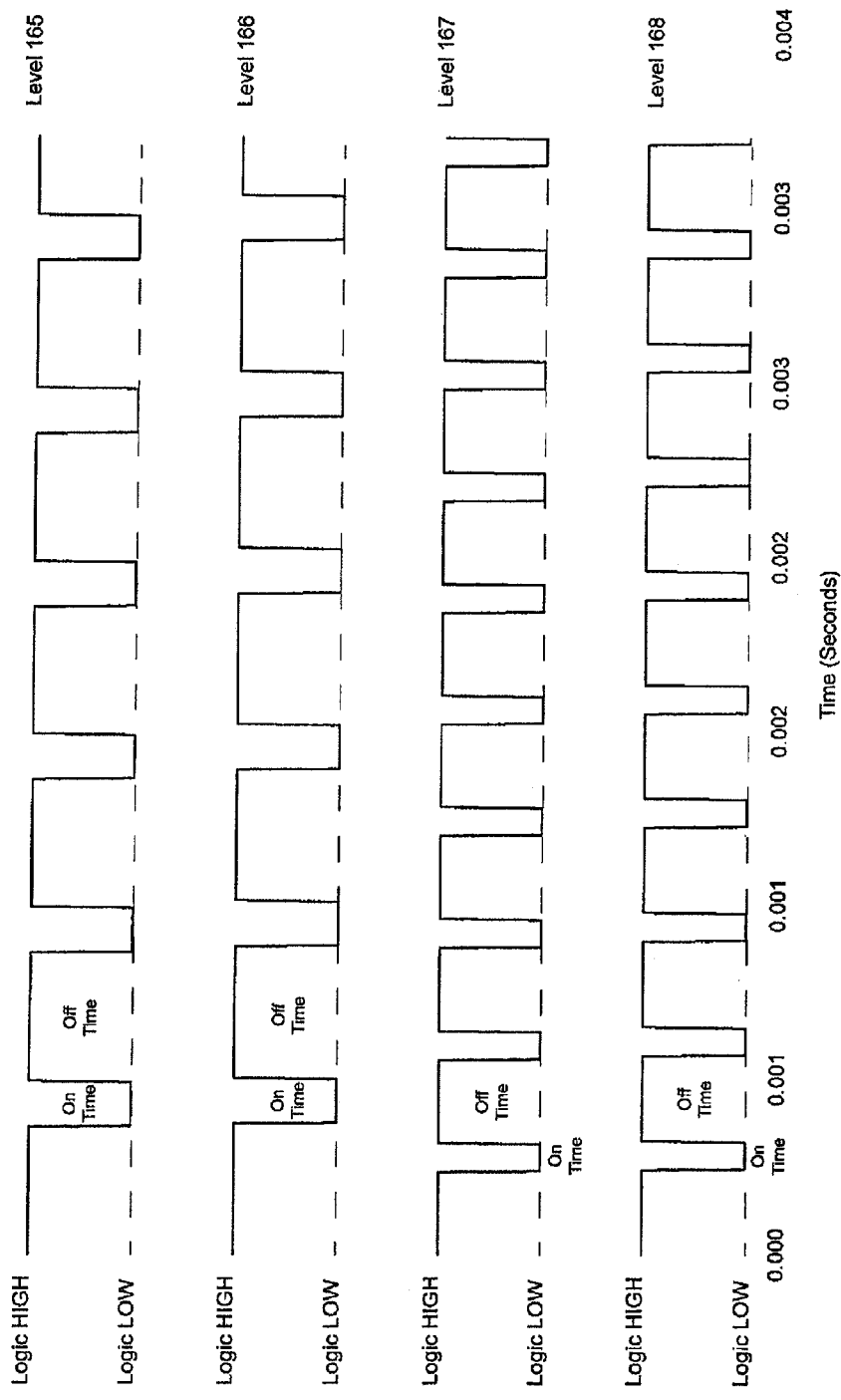
FIG. 2 is a diagram showing waveforms for different DMX Levels.

Digital signal 22 is implemented by a counter which is decremented at regular intervals during a time interrupt such that when the counter reaches 0, the digital signal is toggled. If the digital signal is logic high, the counter is loaded with a new on-time value and if the digital signal is logic low, the counter is loaded with a new off-time value. In other words, on-time and off-time values for the current source 20 are controlled by loading a count-down timer with appropriate new values every time the timer reaches 0. This results in a dimming of the load, such as shown, for example, in FIG. 2 which provides sample digital signal waveforms for different intensity levels.

It will be understood that neither the frequency at which the load is operating nor the time period for which it is operating is a constant and that the method of the current invention allows for the maintenance of the output dimming frequency current within a narrow dynamic range. It will be further understood that specifying any two of on-time, off-time, and period is mathematically equivalent, and that period and frequency are inversely related, and thus, it is equivalent to specify, for example, on-time and frequency, or off-time and period, in place of on-time and off-time.

In a preferred embodiment, the controller 12 modifies the on-time and off-time values during transitions from one light intensity to another to reduce or prevent transient flickers due to sudden changes in the output phase of the current being supplied to the load.

The analog signal provides an analog reference level which is translated to a peak output current during the on-time of the current from the current source. Alternatively, a maximum and minimum peak current may be determined. In one embodiment, the analog signal 24 is typically calculated by the controller 12 using the following algorithm:

Analog signal[$i$]=Analog signal[$i-1$]+Setpoint[$i$]×on-time[$i$]−current_sense_value[$i$]×(on-time[$i$]+off-time[$i$])

where i represents the current time, or state, of the analog signal and i−1 is the previous value of the analog signal and Setpoint equals the required output current with no dimming pulse or off-time. Setpoint is typically dependent on the recommended operating current as set by a manufacturer of the LED being controlled.

For example, assume that analog_signal [$i-1$]=10000, on-time [$i$]=50, off-time [$i$]=50, Setpoint [$i$]=200 and current- _sense_value[i]=95. In this example, setting the analog signal to 10000 results, over time, in a current_sense_value of 95. However, assuming the desired current is Setpoint[i]×on-time[i]/(on-time[i]+off-time[i])=100, the analog signal[i] is calculated as being 10500. This calculation is repeated at regular intervals at a low enough rate that the effective gain of this control loop does not cause it to oscillate, as will be understood by one skilled in the art of digital control loop design. The calculation of the analog signal based on the current sense value allows the output of the current source to be controlled.

Figure 4:
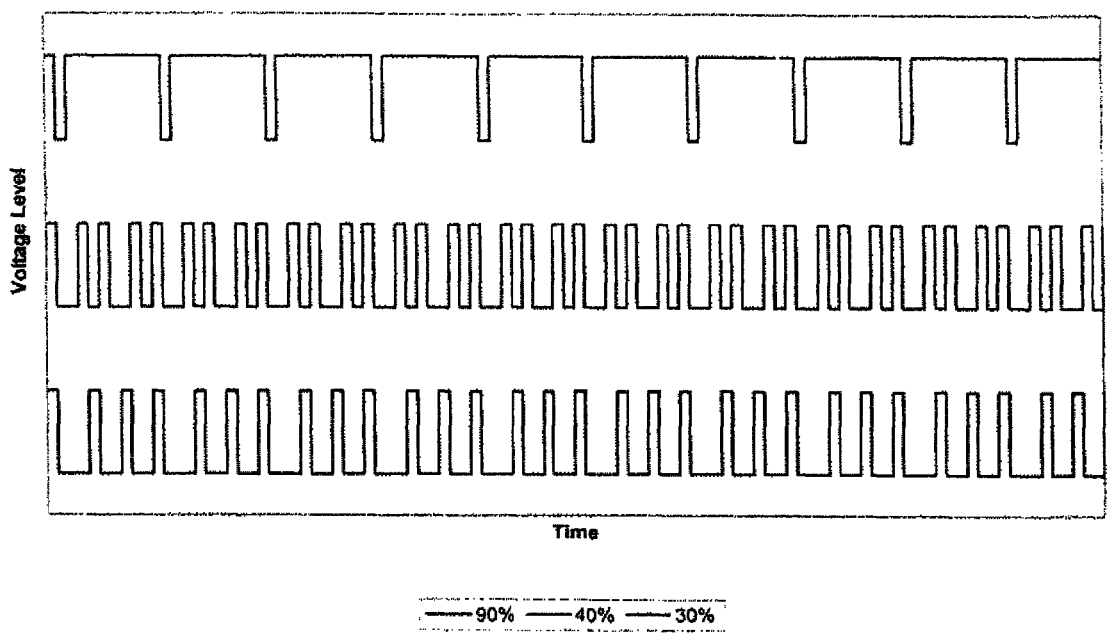
FIG. 4 is a diagram showing simplified 1-Bit DAC waveforms before filtering

After the analog signal is calculated (using the above algorithm), the controller 12 generates an average analog voltage level using a 1-Bit DAC algorithm (as described below). The 1-Bit DAC algorithm is a simple Digital-to-Analog conversion for generating a number of predetermined output digital pulses that are filtered to produce a proportional average analog voltage level. In the preferred embodiment, the DAC algorithm establishes time slots by means of an interrupt every 32 microseconds and updates a pin on the controller 12 twice every interrupt. More specifically, the algorithm divides the time period of 8192 microseconds into 256×31.875 microsecond intervals and 256×125 nanosecond intervals. By selecting which time slots are set high and which are set low, approximately $2^{16}$ analog levels are available, as schematically shown in FIG. 4. It will be understood that this DAC algorithm is an implementation detail, and that a hardware DAC may be used to the same effect.

After generating the analog signal, this analog signal is transmitted to the current source (step 106) to establish an upper and lower peak current range for the hysteretic control and thereby a peak output of the current being provided by the current source 20. The analog signal is transmitted independent of the digital signal since it varies much more slowly than the digital signal. Concurrently, the digital signal provides the on-time and off-time information to the current source 20 so that the combination of the analog and digital signals provides load control information to the current source for operation and control of the load 26.

After receiving the analog and digital signals, the current source provides a current (in accordance with the analog and digital signals) to the load (step 108). While the current is being provided to the load, the current sense 28, senses the output of the current source 20 (step 110) and transmits a signal, the current_sense_value, to the controller 12 (step 112) to forward the current level as a part of the feedback control loop so that a constant output peak current from the current source is maintained and compensates for variations in the load 26 and/or current source 20.

Figure 5:
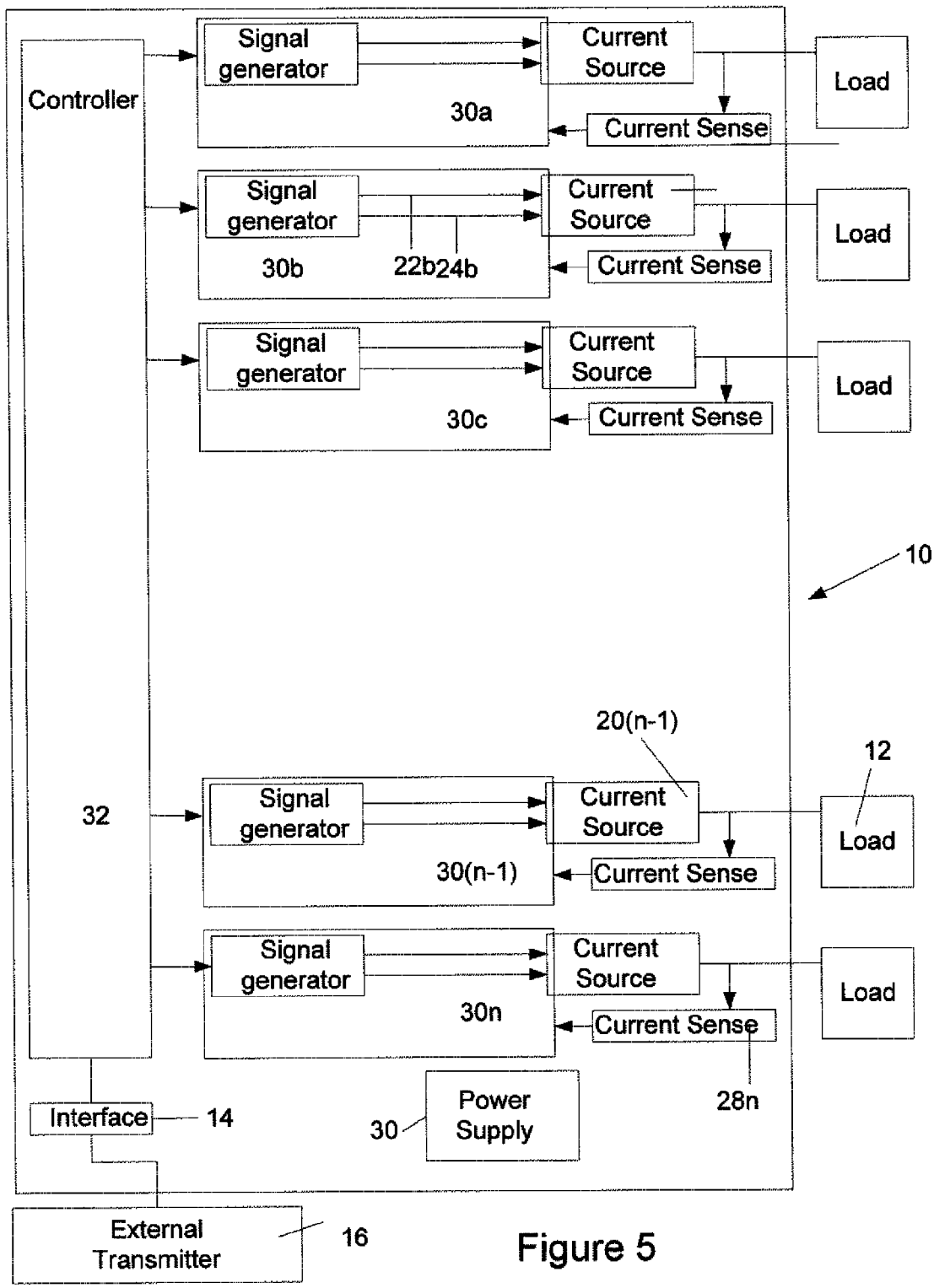
FIG. 5 is schematic diagram of a second embodiment of apparatus for controlling LEDs.

Turning to FIG. 5, a second embodiment of apparatus for dimming and/or colour mixing LEDs is shown. In this further embodiment, each of the loads are controlled by individual load controllers 30, individually denoted as 30a to 30n. The functionality of the controller 12 is split between a main controller 32 and individual load controllers 30. All other parts are identical to the embodiment of FIG. 1 and are denoted as such.

The main controller 32 receives the dimming and/or colour mixing information, in the form of a serial data stream, from the external transmitter 16 via the internal interface 14 and translates this information to controller information, in the form of a more easily decoded synchronous data stream, and transmits this controller information to the individual load controllers 30a to 30n. This simplified controller information, or words of data, is preferably transmitted over a shared "sync" line, a shared "clock" line and a set of parallel "data" lines. The start of each word is preferably delimited by the "sync" line and the start of each bit is delimited by the "clock" line. In yet a further embodiment, the controller information may be transmitted to the individual load controllers 30 via a shared data line or a daisychain arrangement.

After the load controller 30 receives the controller information, the load controller 30 performs calculations as outlined above with respect to the controller 12. Operation of the loads 26 is then controlled by the individual load controllers 30 based on the information transmitted from the main controller 32. Due to greater processing power available from the individual load controllers 30, refinements of the formula listed above are possible. For example, the formula for the analog signal may be replaced by:

$$\text{Analog signal}[i] = \text{Analog signal}[i-1] + (\text{desired current}[i] - \text{current\_sense\_value}[i]) \times \text{gain\_term}$$

where desired_current is pre-determined as Setpoint×(on-time[i]/(on-time[i]+off-time[i]) and gain_term is a constant such as $2^{14}$. Further, by removing the need to calculate the analog signal for a short period after the ratio of on-time to off-time has changed, it is also possible to avoid overshoots and undershoots in dimming current. After the digital and analog signals are computed, they are transmitted to the current source which then provides a current to the load, in accordance with the digital and analog signals. As before, the current sense provides a digital feedback loop for each current source 20.

Figure 8:
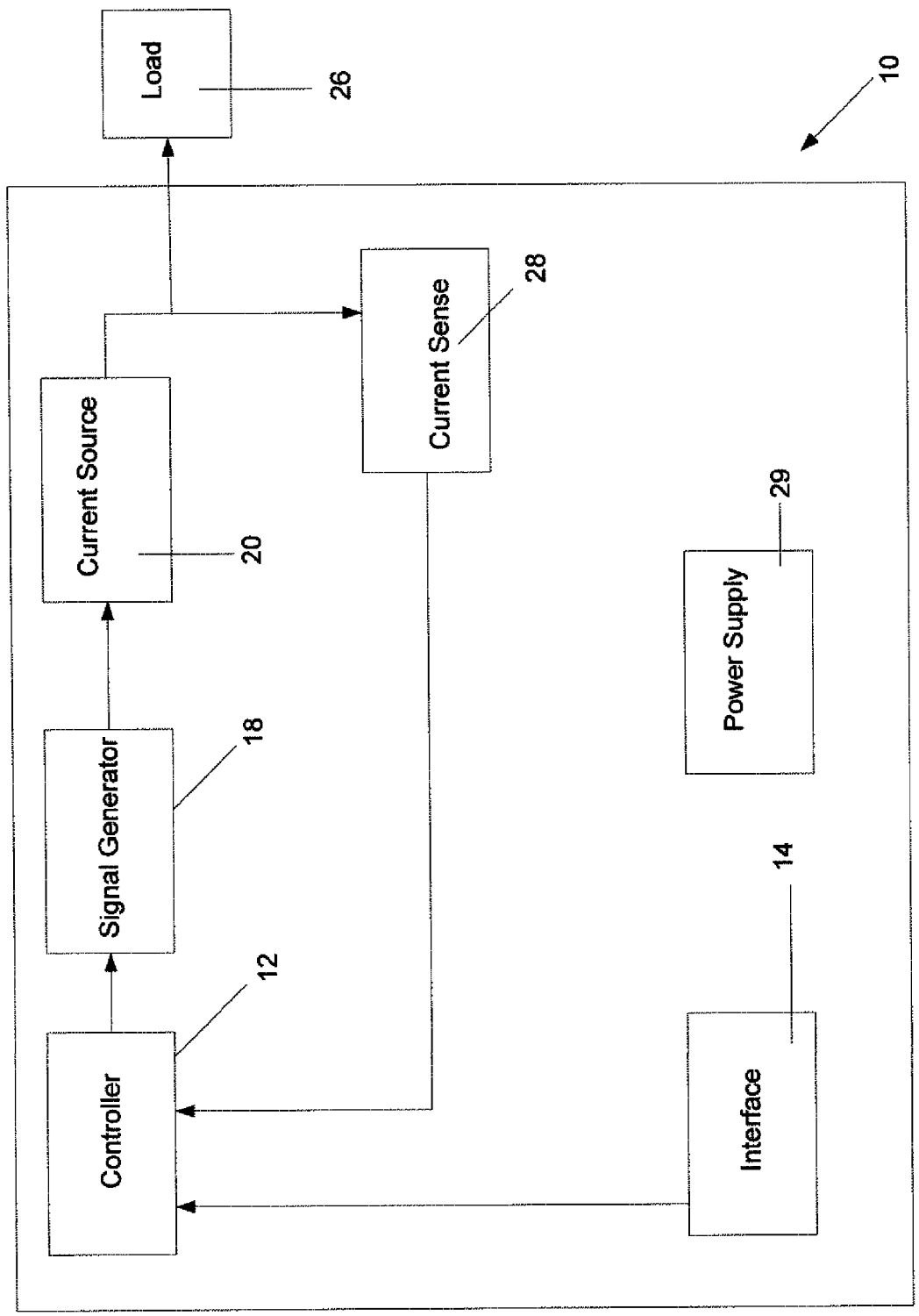
FIG. 8 is a schematic diagram of yet a further embodiment of apparatus for controlling LEDs.

Turning to FIG. 8, yet a further embodiment of apparatus for controlling a load is shown. As with the other embodiments, the apparatus 10 comprises an interface 14 for communicating with an external transmitter to receive dimming and/or colour mixing information, a controller 12 for translating the dimming and colour mixing information to load control information, a signal generator 18 which receives the load control information from the controller 12, a current source 20 for providing the necessary current to power the load 26 and a current sense 28 which forms a part of a feedback loop to assist in controlling he current source. A power supply 29 is also located within the apparatus.

In this embodiment, the signal generator 18 preferably includes a complex digital to analog converter which allows only a single signal containing the on-time, the off-time and the minimum and maximum peak output current information to be transmitted to the current source in order to control the current source 20.

In a further embodiment, the current sense may be removed if the current source is sufficiently well regulated. For example, a current source comprising a transistor, a well-regulated voltage source, and a rheostat in series with an LED may be adjusted as to need no further adjustments. In this embodiment, the analog signal computation is omitted and only the digital signal (with on and off times) is used.

In another alternative embodiment, each of the current sources may be a removable module or may be a monolithic component of the apparatus. It is understood that the current sources 20 may comprise many alternate topologies, so long as they can be turned "on" and "off" through some digital signal. Furthermore, the control loop (current sense) may be removed if the natural current provided by the current source is the desired peak current for a given application of the LEDs.

In yet a further embodiment, the apparatus may be a single controller for controlling a single load by controlling operation of the load via on and off times.

In a further embodiment, the controller 12 and the signal generator 18 are located within a microcontroller.

In yet another embodiment, the main controller 32 translates the received dimming and/or colour mixing information to LED control information and transmits the LED control information to the individual controllers which then uses this information to control its associated current source.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. Apparatus for controlling a set of light emitting diodes (LEDs) comprising:
   at least one current source for powering said set of LEDs; and
   at least one controller for controlling said at least one current source via LED control information;
   wherein over a portion of a range of dimming intensity levels from 0% to 25%, said LED control information includes individual on times and off times and period for each dimming intensity level, the individual period composed of the sum of on time and off time for the associated dimming intensity level, whereby each individual on time is used to construct a single pulse;
   wherein over a portion of the range of dimming intensity levels from 0% to 25%, the individual on and off times, the sum of on time and off time, and period are all variable and not held constant;
   wherein over a portion of the range of dimming intensity levels from 0 to 25%, for consecutive dimming intensity levels, the change in desired intensity is less than 3%.

2. The apparatus of claim 1 wherein said at least one controller receives dimming or colour mixing information and translates said information to said LED control information.

3. The apparatus of claim 2 further comprising:
   a main controller for transmitting said dimming or colour mixing information to each of said at least one controller.

4. The apparatus of claim 3 further comprising:
   an interface for receiving said dimming or colour mixing information and for transmitting said dimming and colour mixing information to said main controller.

5. The apparatus of claim 2 further comprising:
   an interface for receiving said dimming or colour mixing information and for transmitting said dimming and colour mixing information to each of said at least one controller.

6. The apparatus of claim 1 wherein said set of LEDs includes a plurality of subsets of LEDs, each of said subsets of LEDs associated with one of said at least one current source and is directed connected to the at least one current source.

7. The apparatus of claim 6 wherein each of said at least one current source and its associated controller form an individual module.

8. The apparatus of claim 6 wherein each of said at least one current source is associated with one of said at least one controller.

9. The apparatus of claim 8 wherein each of said at least one controller comprises:
   at least one signal generator for transmitting said LED control information to said at least one current source in the form of a digital signal and an analog signal.

10. The apparatus of claim 8 wherein said LED control information further comprises desired peak levels for said at least one current source.

11. The apparatus of claim 10 wherein said desired peak level is controlled by each of said at least one controller.

12. The apparatus of claim 1 wherein each of said at least one controller comprises:
    a signal generator for transmitting said LED control information to said at least one current source in the form of a digital signal and an analog signal.

13. The apparatus of claim 12 wherein said LED control information further comprises desired peak levels for said at least one current source.

14. The apparatus of claim 1 wherein said LED control information further comprises desired peak levels for said at least one current source.

15. The apparatus of claim 14 wherein said desired peak level is controlled by said at least one controller.

16. The apparatus of claim 1 further comprising:
    at least one current sense for sensing a level of output of said at least one current source and for transmitting said level of output to said at least one controller to provide a feedback loop for said at least one current source.

17. The apparatus of claim 16 further comprising a current sense associated with each of said at least one current source.

18. The apparatus of claim 16 wherein said feedback loop is a digital feedback loop.

19. The apparatus of claim 1 wherein said at least one current source comprises a buck circuit power stage with hysteretic control.

20. The apparatus of claim 1 further comprising a power supply.

21. The apparatus of claim 1 further comprising:
    a main controller for transmitting said LED control information to each of said at least one controller.

22. The apparatus of claim 1 wherein said LED control information comprises:
    a digital signal; and
    an analog signal.

23. The apparatus of claim 22 wherein said digital signal comprises said on and off time information.

24. The apparatus of claim 22 wherein said analog signal comprises a peak current for said at least one current source.

25. A method of controlling a set of LEDs comprising the steps of:
    receiving or generating dimming or colour mixing information;
    translating said dimming or colour mixing information into LED control information based on individual on and off times and period; and
    transmitting said LED control information to at least one current source for powering said set of LEDs;
    wherein each individual on time is used to construct a single on pulse; and
    wherein a ratio of on time to a sum of on and off time corresponds to a dimming intensity level; and
    wherein over a portion of a range of dimming intensity levels from 0% to 25%, the individual on and off times, the sum of on time and off time, and period are all variable and not held constant; and
    wherein over a portion of the range of dimming intensity levels from 0 to 25%, for consecutive dimming intensity levels, the change in desired intensity is less than 3%.

26. The method of claim 25 wherein said step of translating comprises the steps of:
    creating a digital signal; and
    creating an analog signal.

27. The method of claim 26 wherein said step of creating a digital signal comprises the steps of:
    determining said on and off time information; and translating said on and off time information to said digital signal.

28. The method of claim 26 wherein said step of creating an analog signal comprises the steps of:

receiving current sensing information; and generating said analog signal based on said current sensing information.

* * * * *